Sept. 28, 1965     F. C. KALMBACH ETAL     3,208,512
HEAT EXCHANGER FOR ROTARY KILN AND THE LIKE
Filed July 24, 1963     3 Sheets-Sheet 1
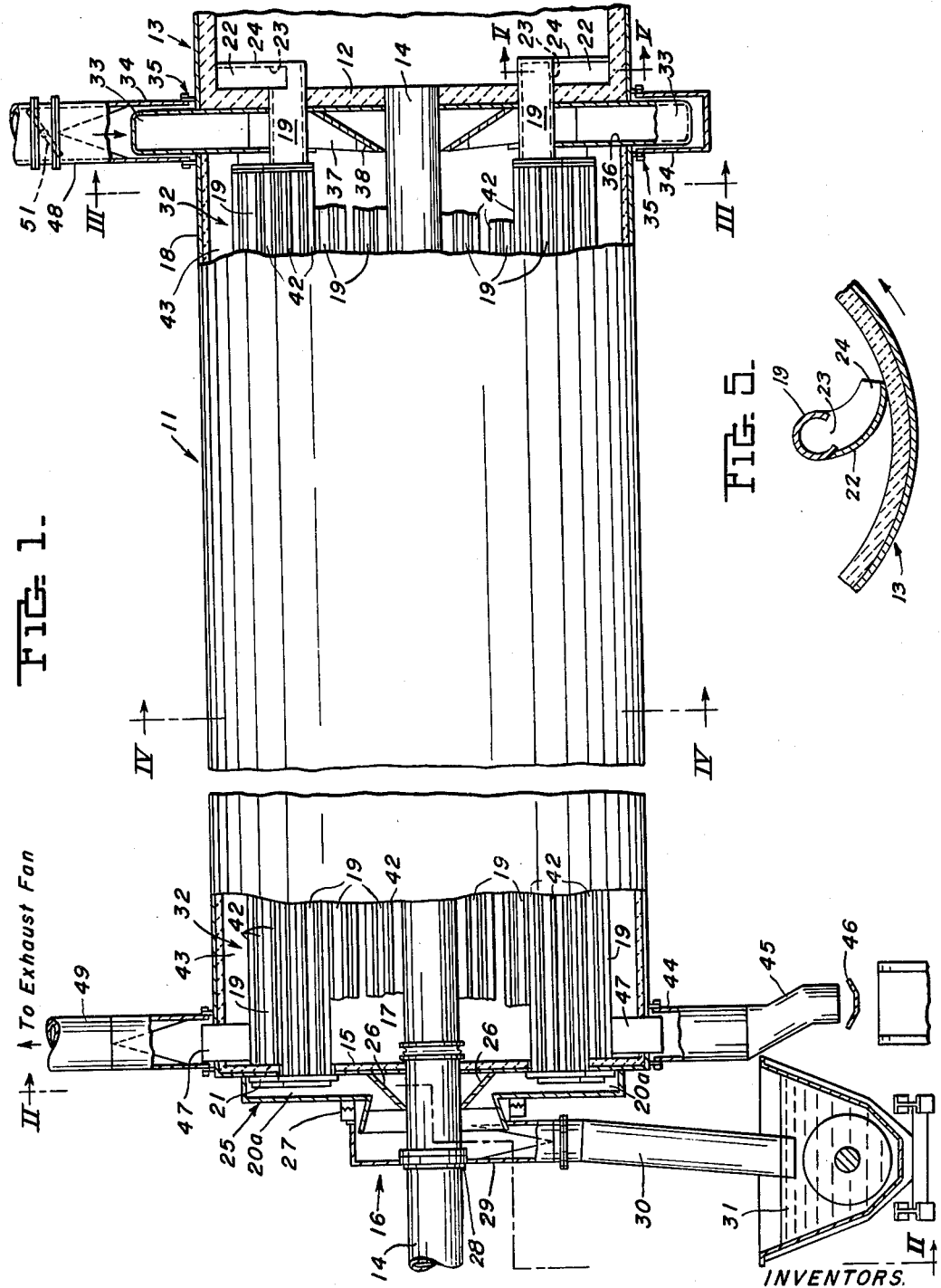
INVENTORS.
FREDERICK C. KALMBACH &
DONALD R. RATHBURN
By Christy, Parmelee, & Strickland
Attorneys

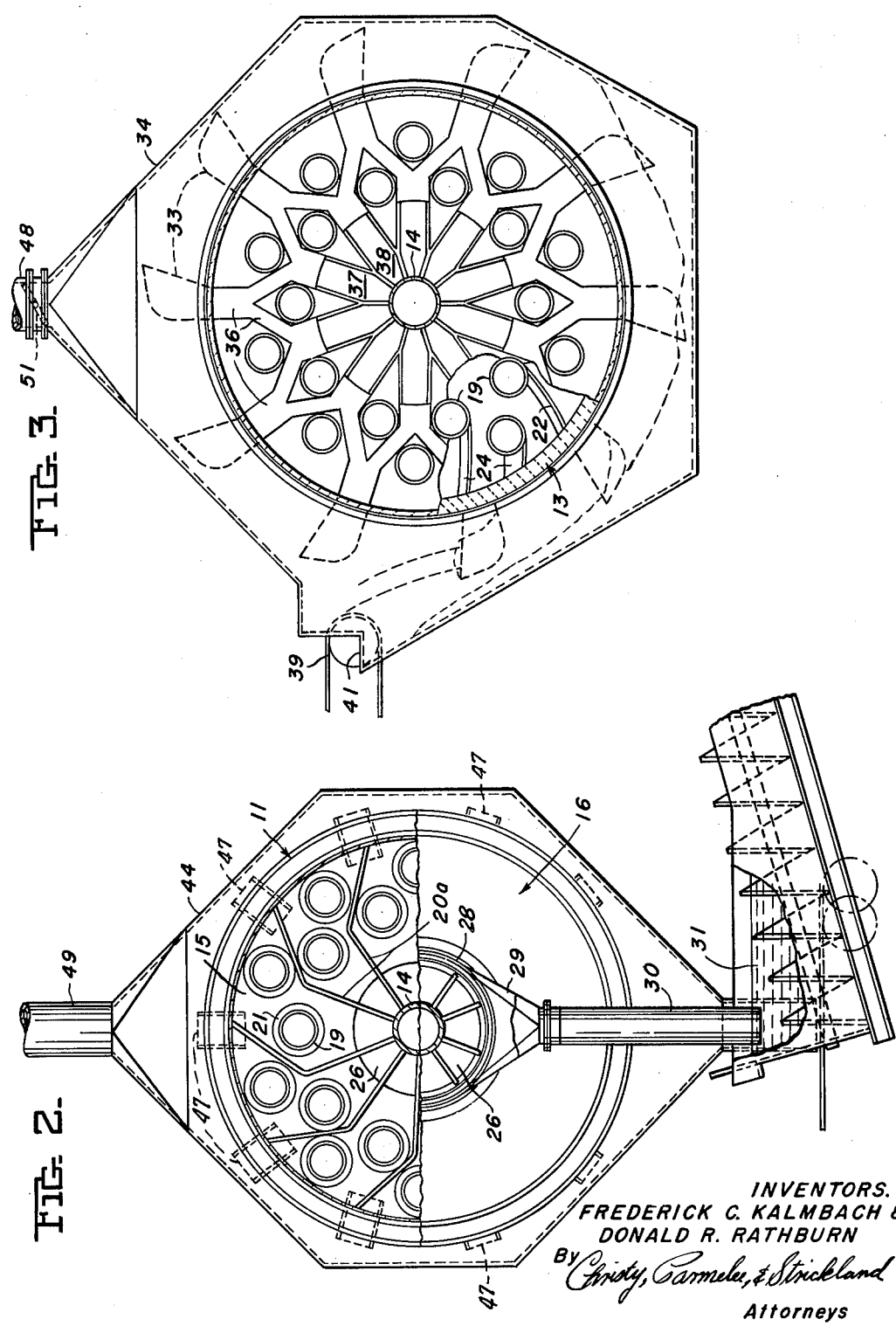

Sept. 28, 1965       F. C. KALMBACH ETAL       3,208,512
HEAT EXCHANGER FOR ROTARY KILN AND THE LIKE
Filed July 24, 1963                          3 Sheets-Sheet 3

INVENTORS.
FREDERICK C. KALMBACH &
DONALD R. RATHBURN
By Christy, Carmelee, & Strickland
Attorneys United States Patent Office 3,208,512
Patented Sept. 28, 1965

3,208,512
HEAT EXCHANGER FOR ROTARY KILN
AND THE LIKE
Frederick C. Kalmbach and Donald R. Rathburn, Coraopolis, Pa., assignors to Dravo Corporation, Pittsburgh, Pa., a corporation of Pennsylvania
Filed July 24, 1963, Ser. No. 297,289
7 Claims. (Cl. 165—88)

This invention is for a heat exchanger for addition to rotary kilns and similar rotary industrial equipment wherein material being processed is tumbled about in a heated atmosphere while also traveling lengthwise in a rotating cylindrical enclosure.

Many industrial processes involve the use of rotary kilns or similar structures wherein solids are roasted, calcined, burned or reacted in a heated atmosphere while being tumbled about as the solids travel from one end of the kiln toward the other. When the material being processed reaches the discharge end of the kiln it has been thoroughly heated to a required temperature and both the solid material and the flue gases therefore contain a large amount of sensible heat. In the case of the flue gases the heat may be largely wasted in the stack into which they are discharged and the hot treated material is discharged to lose its heat to the surrounding atmosphere or a quenching liquid.

According to the present invention a heat exchanger is provided at the discharge end of the rotary kiln through which heat from both the kiln gases and the treated solids is transferred to other solids, usually feed material for subsequent use in the kiln, for drying, preheating or other operation which can be effected by the available heat. This exchanger comprises generally a cylindrical shell that may constitute in effect an extension of the kiln itself but partially separated from the kiln by a transverse partition. Transfer means on the kiln side of the partition direct material from the kiln into an annular series of tubes extending lengthwise within the heat exchanger and which constitutes annular conduit means for transferring solids through the heat exchanger to its discharge end. An axially extending flue pipe carries hot gases from the kiln lengthwise of the heat exchanger for ultimate discharge into a stack. It constitutes not only a flue pipe but also a radiator for heating the environment inside the exchanger. The solids passing through the annular series of tubes and the gases in the flue pipe both yield their heat to the interior of the exchanger. Provision is made for introducing raw material to be heated in the exchanger into the end of the exchanger nearest the kiln. In the heat exchanger it is tumbled about over the tubes through which the hot solid material from the kiln is moving and intimately contacted with these tubes while also receiving heat from the central flue pipe. By bringing the cold raw material into the kiln end of the heat exchanger, a rapid exchange of heat takes place, which is desirable for effecting rapid cooling of the processed material. While the kiln gases, the kiln product, and the raw material are all in heat exchange relation, they are substantially out of direct physical contact, except for the small amount of flue gases that may be entrained with the solids as they are removed from the kiln.

Accordingly, it is an object of the present invention to provide a new and improved kiln heat exchanger for heating and drying raw materials.

Another object is the provision of a heat exchanger and kiln apparatus utilizing the kiln processing heat for the pretreatment of raw materials, especially those which are to be subsequently processed in the kiln.

A further object is to provide a rotary apparatus for the heat treatment of raw materials where the hot combustion gases for the processing of the material serve also as the heat source for the pretreatment of the material to be processed.

Still another object of the invention is to provide a novel heat exchanger wherein heat treated material from a rotary vessel is protected to prevent exposure to the atmosphere prematurely.

A complete understanding of the invention may be had from the following detailed description of a specific embodiment thereof when read in conjunction with the appended drawings, wherein:

FIG. 1 is an elevational view, partly broken away, depicting the rotary kiln and heat exchanger;

FIG. 2 is a broken vertical transverse section taken along line II—II of FIG. 1 looking in the direction of the arrows;

FIG. 3 is a vertical transverse sectional view of the rotary heat exchanger taken along line III—III of FIG. 1.

FIG. 5 is a fragmentary detail showing a section substantially in the plane of line V—V of FIG. 1.

Figure 4:
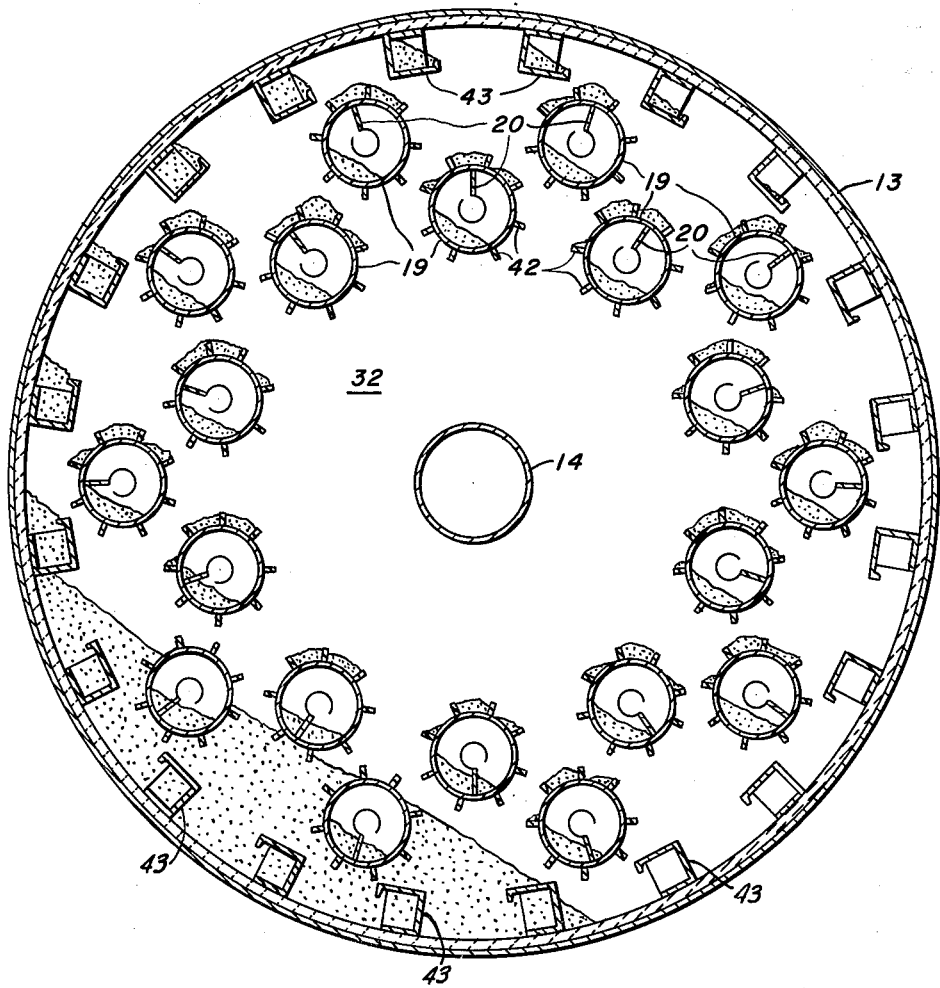
FIG. 4 is a vertical transverse section of the heat exchanger taken along line IV—IV of FIG. 1 intermediate the exchanger ends.

Referring now to the drawings, wherein like reference characters designate like or corresponding parts throughout the several views, there is shown in FIG. 1, which illustrates a preferred embodiment, a cylindrical heat exchanger 11 which is fixed to the endwall 12 of a direct fired kiln 13 of a known or preferred construction. The heat exchanger is thus arranged as an extension of the kiln 13 which rotated with the kiln with the endwall 12 forming a partition separating the kiln and the heat exchanger. The kiln is provided with means for introducing raw material for treatment into the input end of the kiln, not shown, with the treated material being discharged into the heat exchanger by means to be described hereinafter. The combustion gases from the kiln, or most of them are conducted through an axial hot gas duct 14 which extends longitudinally through the exchanger 11 and opens through the endwall 12 of the kiln into the interior of the kiln at one end, and through an endwall 15 and stationary head 16 of the exchanger 11 for connection with a stack, not shown, open to the atmosphere. The duct 14 is provided with an expansion joint 17 to compensate for the expansion and contraction of the duct caused by the changing temperature to which it is necessarily subjected. It provides not only a flue pipe but a radiator for transferring heat through the environment through which it passes.

The exchanger 11 includes a cylindrical sidewall or shell 18 which is connected to the endwall 12 at the end of the kiln and to the discharge endwall 15. A plurality of tubes 19 are arranged within the shell 18 in a pattern concentric about the tube 14 with their ends supported by and passing through the two endwalls. The ends of the tubes at the endwall 15 are longitudinally slidable in sealing plates 21 on the outer face of the endwall 15 to allow for relative expansion and contraction of these tubes. The other ends of the tubes 19 are fixed to the wall 12 through which they pass but each terminates in its own scoop 22 on the kiln side of the wall 12. Each scoop comprises a convolute blade or vane and opens into openings 23 in the sides of the tubes 19 within the kiln 13. As best shown in FIG. 1 in the portion broken away, a planar sidewall 24 forms a part of each scoop. It is parallel to and spaced from the face of the endwall 12 of the kiln and forms with scoops 22 and the endwall, a chute-like trough open in the direction of rotation of the kiln. As the kiln and exchanger apparatus rotate, the fixed-in-position scoops 22 rotate about the kiln axis. Material treated in the kiln is thus picked up by the scoops 22 and directed into the tubes 19. The entire assemblage of kiln and exchanger are supported for rotation on an axis inclined from the horizontal such that the material treated in the kiln is gravity fed to its discharge end for pickup by the scoops 22. To assist in the gravity passage of treated material through the tubes 19, each tube may have an internal screw-type or helical vane 20 which extends throughout its length.

At the discharge end of the heat exchanger there is a cover plate 25 that is spaced from the endwall 15 and material passing through the tubes 19 is discharged into this space. Vanes 20a in this space fixed between endwall 15 and plate 25 carry this material with the rotation of the heat exchanger upwardly until it cascades down against a center cone 26 which directs it forwardly into the fixed receiving head 16. A sliding seal is indicated at 27 between the rotating plate 21 and the fixed head 16 and such a seal is also indicated at 28 between the head 16 and the duct 14.

The kiln treated material is discharged into and through the tubes 19 into the head 16 and the stationary chute 29. Where the material that has been processed or is to be kept out of contact with the air, a down-leg conduit 30 is connected to the chute 29 in gas-tight relation and conducts material within the chute to a water seal 31, with a conveyor similar to a classifier which removes it from the water. The material thus discharged from the kiln 13 through the tubes 19 into the classifier is maintained out of contact with air to avoid the possibility of unwanted oxidation of the processed material at least while it is at a reaction temperature. From the water seal 31 the processed material is delivered for such disposition as desired. This seal is used, however, only when the material such as ore may be wet and would generally not be provided with calcined earthen materials which would be damaged by water.

Thus far the description of the invention has been directed to the discharge of treated material and exhaust gases from the kiln 13 through the heat exchanger 11. The heat contained by the treated material and the gases is transferred in the exchanger to raw material for its pretreatment in advance of roasting or other heat treatment within the kiln. Raw material is introduced into chamber 32 by means of bucket scoops 33, FIGS. 1 and 3, the peripheral ends of which project into and are enclosed by a stationary walled housing 34 with vertical walls which are mounted about the sidewall 18 of the exchanger and flexible seals are provided at 35 between the housing and the rotating heat exchanger. The scoops 33 include channels 36 fixed to a face of the kiln endwall 12, and the channels are convergent toward the axis of rotation of the exchanger. The channels 36 open onto radial deflector plates 37 which are connected to form a segmented cone 38 which slopes toward the exchanger chamber 32 into which material is deflected as it is introduced to the exchanger by the scoops 33.

In FIG. 3 of the drawings, the housing 34 which surrounds the sidewall 18 of the exchanger 11 is depicted as being of generally hexagonal section. One wall of the housing is designed for open communication with a raw material feed conveyor 39 positioned adjacent the housing so as to discharge material into the housing through an opening 41 provided therein. The material fed into the housing 34 is both picked up by the scoops 33 from the housing lower portion as it accumulates, and spilled directly into the rotating scoops. As the raw material is introduced into the chamber 32 of the heat exchanger, it first is directed by the deflector plates 37 onto the hot gas duct 14. The rotation of the kiln and exchanger which is occurring as the raw material is fed into the exchanger imparts a tumbling action to such material. To further aid in the agitation of the raw material for best heating results the exterior of the tubes 19 are provided with longitudinally extending radial fins 42 which are disposed on the tube peripheries. As particularly shown in FIG. 4, the raw material is carried in direct contact with the tubes 19 by the fins 42 whereby the heat of the treated material passing from the kiln 13 through the tubes 19 is transferred to the raw material for heating and drying the material. The material retained by the fins 42 on the peripheries of the tubes 19 is dumped continuously into the lower area of the rotating exchanger where it is repeatedly caused to be placed onto the fins 42 of another tube by passage of the latter through the pile of accumulated material. The tubes 19, as shown in FIG. 4, are preferably arranged in two concentric circles about the exchanger axis of rotation, the outer circle of tubes passing through the accumulated raw material and the inner tubes receiving raw material between fins 42 by spillage of material from the tubes of the outer circle and from the tumbling material as it is introduced into the exchanger. Trough-lines or L-shaped lifts 43 (see FIG. 4) are attached to the inner surface of the heat exchanger sidewall 18 and are open to the material disposed in the chamber 32 so as to elevate the material above the hot gas duct 14 and to cascade the lifted material over tubes 19 and duct 14 as the lifts rotate with the exchanger 11. Thorough agitation of the raw material within the chamber 32 is thus assured by the combined rotation of the tubes 19 with their fins 42 and the lifts 43.

At the discharge end of the heat exchanger a discharge enclosure 44 is flexibly sealed to the terminal sidewall portion of the exchanger. This enclosure is of hexagonal vertical section similar to that of the housing 34 through which raw material is fed to the heat exchanger. A discharge chute 45 empties raw material passed through the chamber 32 of the heat exchanger 11 into a conveyor 46 which is coupled to the feed system, not shown, of the kiln 13. Raw material which is heated in the heat exchanger is discharged through outlets 47 which are spaced radially and which extend through the sidewall 18 of the exchanger 11 into communication with the discharge chute 45. At the uppermost part of the feed housing 34 and at the top of the discharge enclosure 44 are located conduits 48 and 49, respectively, the latter being for connection to an exhaust fan, not shown. The inlet conduit 48 is provided with a damper 51 for regulation of the volume of air flow into the chamber 32 of the heat exchanger 11 and out discharge pipe 49. The forced air circuit established is utilized to control the temperature within the heat exchanger, lowering it if the raw material is being heated too highly by the heat transferred from the kiln treated material in the tubes 19 and from the hot gas duct 14.

It will therefore be seen that the heat of exhaust gases from a rotary reaction vessel and the heat retained by processed material is utilized in a heat exchanger contiguous the vessel for heating and drying raw material either for use elsewhere or to be subsequently processed. When desired, treated material discharged from the reaction vessel and passed through the exchanger is maintained in an atmosphere sealed from the ambient environment, and the treated material is thus protected against oxidation.

It is manifest that the above-described embodiment of the invention is merely illustrative and that numerous modifications may be made within the spirit and scope of the invention.

What is claimed is:

1. A rotary kiln and heat exchanger apparatus comprising a rotary cylinder within which material is treated by heat of gases therein, a chamber fixed to the cylinder and rotatable therewith, means for passing heat treated material from the cylinder to and through the chamber, means for passing hot gases from the cylinder to and through the chamber, means for introducing raw material into and through the chamber, the latter means being sealed from the means for passing hot gas and the means for passing heat treated material through the chamber, and means for conveying raw material discharged from the chamber to the cylinder for processing.

2. A rotary vessel and heat exchanger apparatus as in claim 1 wherein the means for passing hot gases to and through the chamber and the means for passing heat treated material to and through the chamber are sealed from each other and the latter means is sealed from the atmosphere for protection of material as it passes from the cylinder and through the chamber.

3. In a kiln or the like comprising an axially rotating cylinder with a discharge end, a cylindrical extension at the discharge end separated therefrom by a transverse partition, annularly disposed conduit means within the extension for conveying material from the kiln through the extension, means effective upon rotation of the kiln for introducing solids from the kiln into said conduit means, a flue pipe at the discharge end of the kiln extending axially through the extension, means adjacent the partition for introducing raw material to be heated in the extension upon rotation thereof, means at the end of the extension remote from the partition for collecting and discharging material that is passed through the conduit means, and means at the last named end for discharging the raw material from the extension.

4. The combination with a rotary kiln, of a walled cylindrical heat exchanger extending coaxially therefrom and connected thereto at the discharge end of the kiln and rotatable with the kiln, a partition separating the kiln and the heat exchanger, an axial gas conduit extending through the partition and lengthwise through the exchanger for conducting heated gases from the kiln through said conduit to atmosphere, a plurality of spaced tubes extending lengthwise within the exchanger positioned about the axial gas conduit, the tubes extending through the said partition and opening into the discharge end of the kiln, scoops within the kiln adjacent the partition connected to the tubes for gathering material in the kiln and discharging it into the tubes, an end wall at the opposite end of the exchanger from the partition through which the other ends of said tubes pass and forming an end closure for the exchanger, means beyond said end wall for receiving material discharged from the tubes, means at one end of the heat exchanger for introducing material to be heated thereto, and means adjacent the opposite end of the exchanger for removing material therefrom.

5. The combination defined in claim 4 wherein said means for receiving material from the tubes is substantially sealed against the end wall of the heat exchanger and about said axial conduit to exclude air from said receiving means.

6. A rotary kiln and heat exchanger apparatus comprising a rotary reaction vessel having a material discharge end, a heat exchanger fixed to the discharge end of the vessel and extending axially therefrom and connected thereto for rotation therewith, a duct for conducting hot gases from the interior of the vessel attached to the discharge end of the vessel and extending through the full length of the heat exchanger and opening to the atmosphere beyond the exchanger, a plurality of longitudinally-extending spaced tubes fixed within the heat exchanger about the duct and in spaced relation thereto, the tubes each opening at one end into said reaction vessel, means in the said vessel connected to the said ends of the tubes for transferring material from the interior of the vessel into the tubes, a fixed housing surrounding the exchanger at one end, scoops mounted on the exterior of the exchanger for rotation therewith and arranged to collect material from within the fixed housing and discharge it into the exchanger, said housing having a material-receiving opening through which material to be heated in said exchanger is delivered to the housing.

7. A rotary kiln and heat exchanger apparatus as defined in claim 6 wherein said fixed housing is adjacent the end of the exchanger nearest the vessel, a second fixed housing surrounding the exchanger adjacent its opposite end for receiving material discharged from the exchanger, an air inlet passage on said first fixed housing and an air exhaust passage on the second fixed housing whereby atmospheric air may be circulated through the exchanger, and means for controlling the flow of air through at least one of said passages.

References Cited by the Examiner

UNITED STATES PATENTS

| 1,547,331 | 7/25 | Kacser. | |
|---|---|---|---|
| 1,832,192 | 11/31 | Eichenlaub et al. | 263—32 XR |
| 1,936,293 | 11/33 | Daub | 165—88 |
| 2,845,259 | 7/58 | Henrichsen | 263—32 |

FOREIGN PATENTS

| 453,551 | 12/48 | Canada. |
|---|---|---|
| 669,387 | 8/29 | France. |

FREDERICK L. MATTESON, Jr., *Primary Examiner.*

CHARLES SUKALO, *Examiner.*